United States Patent [19]

Ploner

[11] 3,917,735

[45] Nov. 4, 1975

[54] PROCESS FOR MAKING 1,3,6-OCTATRIENES BY DIMERIZATION

[75] Inventor: Klaus-Jurgen Ploner, Greifensee, Switzerland

[73] Assignee: Givaudan Corporation, Clifton, N.J.

[22] Filed: Jan. 30, 1974

[21] Appl. No.: 438,084

[30] Foreign Application Priority Data
Feb. 2, 1973  Switzerland.......................... 1553/73

[52] U.S. Cl. ....... 260/677 R; 260/680 B; 260/666 B
[51] Int. Cl.².................... C07C 11/00; C07C 11/21
[58] Field of Search ........ 260/677 R, 666 B, 680 R, 260/680 B

[56] References Cited
UNITED STATES PATENTS

| | | | |
|---|---|---|---|
| 3,219,716 | 11/1965 | Wittenberg et al. ............ | 260/666 R |
| 3,372,206 | 3/1968 | Pruett et al. .................... | 260/666 B |
| 3,444,258 | 5/1969 | Kohnle et al.................... | 260/677 R |
| 3,457,319 | 7/1969 | Olechowski et al............. | 260/677 R |
| 3,641,175 | 2/1972 | Wilke et al...................... | 260/677 R |
| 3,689,585 | 9/1972 | Morikawa ....................... | 260/677 R |
| 3,708,551 | 1/1973 | Kittleman et al. .............. | 260/683 D |

FOREIGN PATENTS OR APPLICATIONS

| | | | |
|---|---|---|---|
| 2,063,038 | 7/1971 | Germany......................... | 260/677 R |

*Primary Examiner*—Delbert E. Gantz
*Assistant Examiner*—Juanita M. Nelson
*Attorney, Agent, or Firm*—Thomas Cifelli, Jr.

[57] ABSTRACT

Catalytic process for dimerizing substituted 1,3-butadienes in presence of zirconium and vanadium catalysts at elevated temperatures, with or without solvents and co-catalysts such as phosphines.

9 Claims, No Drawings

PROCESS FOR MAKING 1,3,6-OCTATRIENES BY DIMERIZATION

FIELD OF THE INVENTION

This invention relates to the field of organic chemistry.

SUMMARY OF THE INVENTION

The unsaturated compounds obtained according to the present process have the following general formula

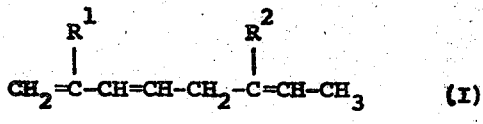

wherein $R^1$ and $R^2$ represent a lower alkyl or lower alkenyl group.

According to the present invention, the unsaturated compounds of formula I hereinbefore are manufactured by treating a compound of the general formula

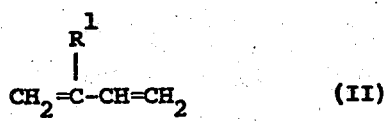

wherein $R^1$ has the significance given earlier,
or mixtures of compounds of formula II with a catalyst of the formula $(R_3SiO)_4Zr$ or $(R_3SiO)_3VO$ and a compound of the formula $AlR_2X$, in which X represents a halogen atom and R represents a lower alkyl, cycloalkyl, phenyl or phenyl-(lower alkyl) group and in which the R-symbols can be different from one another.

PRIOR ART

The hitherto known processes for the manufacture of unsaturated compounds of formula I are unsatisfactory. Thus, for example, in the process described in German Offenlegungsschrift No. 2063038 there are used Zr catalysts which are sensitive to air and moisture. On the contrary, the Zr and V catalysts used in accordance with the present invention can be handled without special precautions. Moreover, the process provided by the present invention differs from known processes in that it has a higher selectivity, i.e., the formation of undesired side-products is greatly reduced.

DESCRIPTION OF THE PREFERRED EMBODIMENTS

As used in this description and in the accompanying claims, the term "lower" means groups containing up to 7 carbon atoms. Examples of lower alkyl groups are the methyl, ethyl, propyl and butyl groups as well as isomers of the latter two. A preferred lower alkenyl group is the 4-methyl-penten-3-yl group. Particularly preferred compounds of formula II are isoprene, mycrene, β-farnesene, methyl butadiene and propyl butadiene.

The process provided by the present invention can be carried out in the presence of, or in the absence of, a solvent. Aliphatic or aromatic hydrocarbons may be used as the solvent. The process is conveniently carried out at a temperature between 50°C and 200°C, preferably at 70°–120°C. Furthermore, a phosphine, a phosphite, a tertiary amine or an ether can be added to the reaction mixture as a co-catalyst. The addition of such a co-catalyst is preferred when a vanadium catalyst is used in the process. Specific examples of such co-catalysts are trimethylphosphine, triethylphosphine, tripropylphosphine, tributylphosphine, triphenylphosphine and tricresylphosphine, triphenylphosphite, tetrahydrofuran, triethylamine and 2,2'-bipyridyl.

In the present process there are conveniently used, per mol of diene of formula II, 0.1–50 mmol of zirconium or vanadium catalyst and up to 10 mol of co-catalyst per mol of zirconium or vanadium catalyst. The ratio zirconium or vanadium catalyst: aluminum compound conveniently amounts to 1:1 to 1:20.

Examples of zirconium and vanadium catalysts which may find use in the process of the present invention are $Zr[O\ Si(CH_3)_3]_4$; $Zr[O\ Si(C_2H_5)_3]_4$; $Zr[O\ Si(C_6H_5)_3]_4$; $OV[O\ Si(CH_{(CH3)})_3]_3$; $OV[O\ Si(C_6H_5)_3]_3$; $OV[O\ Si(C_6H_{11})_3]_3$ and $OV[O\ Si(C_6H_4CH_3)_3]_3$.

Examples of compounds of the formula $AlR_2X$ are di-ethyl-aluminum chloride; di-propyl-aluminum chloride; di-butyl-aluminum chloride; di-isobutyl-aluminum chloride; di-octyl-aluminum chloride, di-ethyl aluminum bromide and mixtures of one mole aluminum chloride and two moles triethyl aluminum or two moles triisobutyl aluminum; and one mole of aluminum bromide and two moles of triisobutyl aluminum.

The zirconium and vanadium compounds which are used as the catalysts, insofar as they are not known, can be prepared in analogy to processes known per se (see J. Chem. Soc. 1959, 3404).

The following Examples illustrate the present invention:

EXAMPLE 1

4.8 g of tetrakis-(triphenyl-silyloxy)-zirconium, 2.1 g of triphenylphosphine, 50 ml of benzene, 50 ml of distilled isoprene and 4.8 g of diethylaluminum chloride were added to a 300 ml autoclave under an argon atmosphere. The autoclave was closed and the mixture stirred for 2 hours at 100°C. Thereafter, the organic products were distilled off from the catalyst at 20°–100°C/0.1 mm Hg into a cooled receiver. After removal of the benzene at 30°C/10 mm Hg, there remained behind 58 g of a colourless oil, gas-chromatographic analysis (phase: Apiezon L) of which yielded the following results:

82 percent 2,6-dimethyl-1,3,6-octatriene,
6 percent 2,7-dimethyl-1,3,6-octatriene,
2 percent cyclic isoprene dimer,
10 percent isoprene trimer.

The 2,6-dimethyl-1,3,6-octatriene ($n_D^{20} = 1.4806$) was obtained in pure form by repeated distillation on a spinning-band column at 53°C/10 Torr. The catalyst remaining behind after the distillation can be re-used immediately after the addition of diethylaluminium chloride.

EXAMPLE 2

68 g of distilled isoprene, 13.6 g of myrcene (97 percent), 4.8 g of tetrakis-(triphenyl-silyloxy)-zirconium, 2.1 g of triphenylphosphine, 100 ml of absolute benzene and 4.8 g of diethylaluminium chloride were placed in a 300 ml autoclave. The diethylaluminium chloride was added finally under argon. After stirring for 2 hours at 100°C, the autoclave was opened and the product added to 200 g of ice and 50 ml of concentrated hydrochloric acid. After extraction with hexane, neutralisation, drying and removal of the solvent, there were obtained 64.5 g of a crude product having the following composition:

| | | |
|---|---|---|
| 1.4% | myrcene | |
| 58.8% | 2,6-dimethyl-1,3,6-octatriene | (b.p. 50°–60°C/ 10 mmHg) |
| 5.0% | 2,7-dimethyl-1,3,6-octatriene | |
| 2.0% | isoprene trimer | |
| 18.6% | $C_{15}$-product (mixture of 2,10-dimethyl-6-methylene-2,7,10-dodecatriene and 2,10-dimethyl-6-ethynyl-1,3,9-undecatriene) | (b.p. 120°–130°C/ 10 mm Hg) |

The $C_{15}$-hydrocarbon can be obtained in pure form by distillation on a spinning-band column at 124°C/10 mm Hg; $n_D^{20} = 1.4962$.

EXAMPLE 3

0.892 g of tris-(triphenylsilyl)-orthovanadate, 0.5 ml of tetrahydrofuran, 50 ml of isoprene and 3.6 ml of diethyl aluminum chloride were added to a 100 ml autoclave under an argon atmosphere. The autoclave was closed and the mixture stirred for 2 hours at 100°C. After cooling the reaction product was added to 50 g of ice and extracted with hexane. After removal of the solvent there were obtained 19.5 g of a colourless oil consisting of 46 percent 2,6-dimethyl-1,3,6-octatriene
8 percent 2,7-dimethyl-1,3,6-octatriene
13 percent cyclic isoprene dimer
33 percent isoprene trimer and polymes.

The unreacted isoprene (14 g) was recovered from the solvent fraction by distillation.

EXAMPLE 4

0.334 g of tris-(trimethylsilyl)-orthovanadate, 0.1 ml of triethylamine, 50 ml of isoprene, 50 ml of hexane and 1.8 ml of diethyl aluminum chloride were reacted for 3 hours in analogy to the procedure of Example 3. There was obtained 59 percent 2,6-dimethyl-1,3,6-octatriene and 10 percent 2,7 dimethyl-1,3,6-octatriene.

What we claim is:
1. A process for the manufacture of unsaturated compounds of the general formula

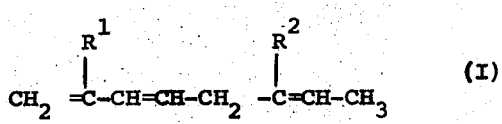

(I)

wherein $R^1$ and $R^2$ represent a lower alkyl or lower alkenyl group, which process comprises reacting a compound of the general formula

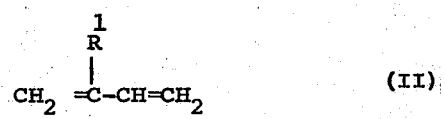

(II)

wherein $R^1$ has the significance given earlier in this claim, or mixtures of compounds of formula II at temperatures within the range from 50°C. to 200°C., with a material selected from the group consisting of a compound of the formula $(R_3SiO)_4Zr$ and $(R_3SiO)_3VO$ and a compound of the formula $AlR_2X$, in which X represent a halogen atom and R is selected from the group consisting of a lower alkyl, cycloalkyl, phenyl and a phenyl-(lower alkyl) group and in which the R-symbols can be different from one another, "lower" meaning a group having up to 7 carbon atoms.

2. A process according to claim 1, wherein a phosphine, a phosphite, a tertiary amine or an ether is added to the reaction mixture as a co-catalyst in amounts up to 10 mol per mol of catalyst.

3. A process according to claim 1, wherein tetrakis-(triphenyl-silyloxy)-zirconium is used as the zirconium compound.

4. A process according to claim 1, wherein diethylaluminum chloride is used as the aluminum compound.

5. A process according to claim 1, wherein triphenylphosphine is added to the reaction mixture.

6. A process according to claim 1, wherein the ratio of zirconium or vanadium catalyst:aluminum compound amounts to 1:1 to 1:20.

7. A process according to claim 1, wherein 0.1–50 mmol of zirconium or vanadium catalyst is used per mol of diene of formula II.

8. A process according to claim 2, wherein isoprene is the compound of formula II, tetrakis-(triphenyl-silyloxy)-zirconium is the catalyst, diethylaluminum chloride is used as the aluminum compound, triphenylphosphine is used as the co-catalyst, and the reaction is conducted in an autoclave under an argon atmosphere at a temperature of about 100°C.

9. A process according to claim 2, wherein a mixture of isoprene and myrcene is reacted in an autoclave in the presence of tetrakis-(triphenyl-silyloxy)-zirconium, triphenyl-phosphine and diethylaluminum chloride under an argon atmosphere at a temperature of about 100°C.

* * * * *

UNITED STATES PATENT OFFICE
CERTIFICATE OF CORRECTION

Patent No. 3,917,735  Dated 11-4-75

Inventor(s) Klaus-Jurgen Ploner

It is certified that error appears in the above-identified patent and that said Letters Patent are hereby corrected as shown below:

Column 2, line 19, "OV[O Si(CH$_{(CH_3)}$)$_3$]$_3$ should read --OV[OSi (CH(CH$_3$)$_3$)]$_3$ --.

Signed and Sealed this sixteenth Day of March 1976

[SEAL]

Attest:

RUTH C. MASON
*Attesting Officer*

C. MARSHALL DANN
*Commissioner of Patents and Trademarks*